United States Patent [19]

Kuwata et al.

[11] Patent Number: 4,691,273
[45] Date of Patent: Sep. 1, 1987

[54] SERIES RESONANT CONVERTER WITH PARALLEL RESONANT CIRCUIT

[75] Inventors: Yutaka Kuwata, Kodaira, Japan; Louis R. Nerone, Cleveland, Ohio

[73] Assignees: Nippon Telegraph & Telephone Corp., Tokyo, Japan; Reliance Comm/Tec Corporation, Chicago, Ill.

[21] Appl. No.: 940,442

[22] Filed: Dec. 11, 1986

[51] Int. Cl.[4] ........................................... H02M 7/538
[52] U.S. Cl. ..................................... 363/132; 363/17; 363/98
[58] Field of Search ............................ 363/17, 98, 132

[56] References Cited

U.S. PATENT DOCUMENTS

| 4,227,243 | 10/1980 | Gurwicz et al. | 363/98 |
| 4,563,731 | 1/1986 | Sato et al. | 363/17 |
| 4,587,604 | 5/1986 | Nerone | 363/17 |

OTHER PUBLICATIONS

Baker, "High Frequency Power Conversion with FET-Controlled Resonant Charge Transfer", PCI Apr. 1983 Proceedings, pp. 130-133.
"dVOS/dt Turn-On in MOSFET's", Siliconix Technical Article, TA84-4.

*Primary Examiner*—R. W. Skudy
*Assistant Examiner*—J. Sterrett
*Attorney, Agent, or Firm*—Michael M. Rickin

[57] ABSTRACT

A parallel resonant circuit for use in a series resonant converter. The parallel resonant circuit is located between the clamp diodes and the dominant series resonant capacitors of the converter. The parallel resonant circuit has a predetermined resonant frequency which is set to be above the telephone voice band. The circuit limits the operating frequency of the converter for light loads to be no lower than the parallel resonant frequency.

10 Claims, 4 Drawing Figures

SERIES RESONANT CONVERTER WITH PARALLEL RESONANT CIRCUIT

BACKGROUND OF THE INVENTION

1. Field of the Invention

This invention relates to series resonant converters and more particularly to such a converter which includes therein a parallel resonant circuit to limit the converter's operating frequency.

2. Description of the Prior Art

Power converters are known in the art and typically serve to accept energy from an unregulated source, such as a voltage source, and derive therefrom a regulated voltage which is applied to a load. The regulation function is performed by interposing a regulating device between the source of energy and the load. One such regulating device known in the art is a switching type device. These operate in a discontinuous manner in controlling the rate of energy transmission. The switching device has two modes of operation, fully on and fully off. The switching device is periodically turned on for a time interval to permit energy transfer for purposes of maintaining the power output at a predetermined level.

Typically, such switching type regulating devices employed in power converters utilize semiconductor devices, such as power field effect transistors (FETS), as the switching devices. These devices are turned fully on, or saturated, or fully off during operation. When fully on, the semiconductor devices are conducting and little or no power is dissipated. Also, when nonconducting or fully off no power is dissipated therein. Power is, however, dissipated in such a semiconductor device during the time interval of switching from a nonconducting condition to a conducting condition and vice versa. It is during the switching time interval that a substantial amount of power may be dissipated in such a semiconductor device, and if large enough this may severely damage the semiconductor device.

Power converters employing switching type regulators utilizing semiconductor devices as power switches have typically been operated such that the power switches supply a squarewave signal to a power transformer which couples the power converter to a load. The squarewave operation requires that the power switches dissipate energy whenever voltage and current are interrupted. Consequently, there is a switching loss which is directly related to the operating frequency of the power switches. This has contributed to limiting such power switches to low power applications during high frequency operation. Otherwise, they are operated at a low frequency using larger components and more space.

It is desirable to provide power converters which are cost effective and which occupy a small amount of space. This, then, necessitates high frequency operation, such as in excess of 20 KHz and preferably at substantially higher frequencies, such as 200 KHz, while transferring large amounts of power, such as on the order of 1500 watts or more. In order to achieve such high frequency operation of power switches, it has been proposed to employ sinusoidal operation as opposed to the squarewave operation typically employed in the prior art. Such a proposal is found in the article "High Frequency Power Conversion With FET-Controlled Resonant Charge Transfer", by R. H. Baker, published in the PCI April, 1983 proceedings, pages 130–133. This article proposed an operation wherein sinusoidal current pulses flow through a series resonant circuit including the primary winding of a power transformer by way of a power switch. Each sinusoidal current pulse terminates to a zero level before the voltage forcing function is withdrawn. As a consequence, the power switches turn on and off at zero current to thereby provide lower component switching loss to reduce component stress.

As reported in Baker, supra, alternate sinusoidal current pulses flow through a series resonant tank circuit. During one half cycle a current pulse flows in a first direction through the primary winding by way of a first power switch and a first capacitor. During the next half cycle a current pulse flows in the opposite direction through the transformer primary winding by way of a second power switch and a second capacitor. These two power switches are each turned on for a fixed time duration with the on times being separated by a minimum fixed interval or dead time during which one switch is turned off and the other is turned on.

The power switches in Baker, supra, are turned on and off at a frequency which varies from a low frequency, for low loading or low power operations, to a high frequency, for high loading or high power operations. At high power operations such a converter operates near its maximum resonant frequency. If the power requirements drop, the operating frequency will drop. Depending upon the application for which such a converter is employed, this variable operating frequency may present problems. If the converter is employed as a high power converter, such as 1500 watts at an operating frequency of 200 KHz, a drop in the loading may result in an objectional operating frequency. For example, if such a converter supplies power to telephone lines, a drop in loading may cause the operating frequency to fall within the telephone voice band, namely, within a frequency range on the order of 300 Hz to 3400 Hz. The ripple voltage supplied to the telephone lines may, during this operating frequency range, inject objectional audible noise onto the telephone lines.

One solution to the problem of audible noise is set forth in U.S. Pat. No. 4,587,604 entitled "A Power Supply Employing Low Power And High Power Series Resonant Converters". As set forth therein, the supply includes both high and low power series resonant converters. Each of the converters include a pair of power switches which are alternately turned on and off. The lower power converter operates in parallel with the higher power converter during high power operations. For low power operations a control operates to disable the higher power converter so that only the low power converter supplies power to the load. While this combination of low and high power converters has been found to operate so as to prevent the resonant frequency from dropping into the audible range, it does require that the supply include what is in effect an extra set of power switches as well as associated control circuitry. Therefore, it is desirable to prevent the resonant frequency from dropping into the audible range without the necessity to add the extra pair of switches and associated circuitry and also without affecting the operation of the FETS used as the power switches in the resonant converter.

SUMMARY OF THE INVENTION

A controllable series resonant converter for providing power to a load. The converter has a power source, first and second connected switches, first and second connected clamp diodes, and first and second connected capacitors. The connected switches, diodes and capacitors are each connected across the power source.

A primary winding of a transformer is interposed between the connected switches and the connected diodes. The converter also includes a control for actuating the switches on and off at an operating frequency which depends upon the load. When the switches are alternately turned on sinusoidal current pulses alternately flow from the source in opposing directions in the primary winding.

The converter further includes a parallel resonant circuit with a predetermined resonant frequency. The circuit is interposed between the clamp diodes and the capacitors. The circuit limits the operating frequency of the converter to be no lower than the parallel resonant frequency.

DESCRIPTION OF THE PREFERRED EMBODIMENT

Figure 1:
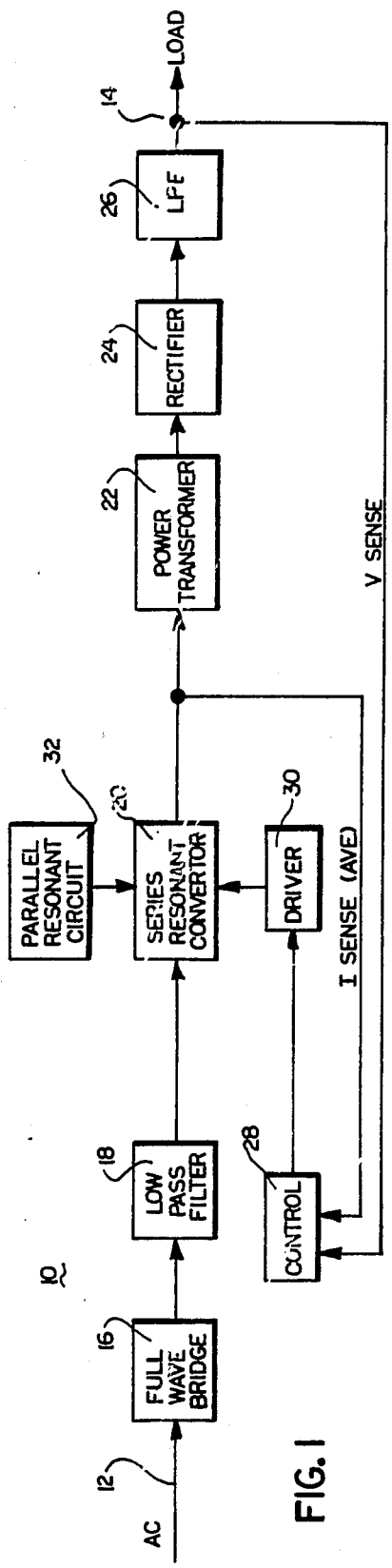
FIG. 1 is a block diagram of a high frequency power supply of the type in which the circuit of the present invention may be used.

Reference is now made to the drawings wherein the showings are for purposes of illustrating a preferred embodiment only. Referring now to FIG. 1, there is shown a block diagram of a high frequency power supply 10 which converts an AC voltage at its input 12 to a regulated DC voltage at its output 14. This is achieved by first rectifying the AC voltage by means of a full wave bridge rectifier 16 and this rectified voltage is then filtered by a low-pass filter (LPF) 18 providing at the output of the filter an unregulated DC voltage.

Supply 10 includes a series resonant power converter 20 which receives the unregulated DC voltage from the low-pass filter 18 and provides the regulated DC voltage at output terminal 14. As will be discussed in greater detail hereinafter, the converter 20 includes a pair of power switches, preferably field effect transistors (FETS), which are arranged in a series half bridge configuration. These are alternately turned fully on and fully off through the use of a pulse position modulation (PPM) technique. In this technique, for stable input and output conditions pulses of constant width are applied to the gate electrodes of the FETS to turn them on for a fixed duration. It is the frequency at which these pulses are applied to the FETS that determines the transfer of power. The series resonant converter includes the primary winding of the power transformer 22 and the secondary winding is coupled to the load 14 by means of a rectifier 24 and a low-pass filter 26.

The switching of the FETS and therefore the operation of supply 10 is generally controlled as a function of either the voltage present at the output terminal 14 or the average current flowing in the primary winding of the power transformer 22. Ordinarily, the supply 10 operates in a voltage controlled mode to provide regulated DC voltage at output 14. As the load varies, the switching of the FETS is controlled to maintain the regulated output.

In addition to regulation based on loading, control 28 also responds to the average current flowing in the series resonant circuit. Consequently, the rate at which current pulses are applied through the power switches and, hence, the series resonant converter circuit is controlled to limit the magnitude of the average current and thereby prevent damage to sensitive power components such as FETS and rectifiers.

A parallel resonant circuit 32 is connected to the series resonant converter 20. As will be described in more detail hereinafter, the circuit 32 functions to limit the operating frequency range of the resonant converter.

Figure 2:
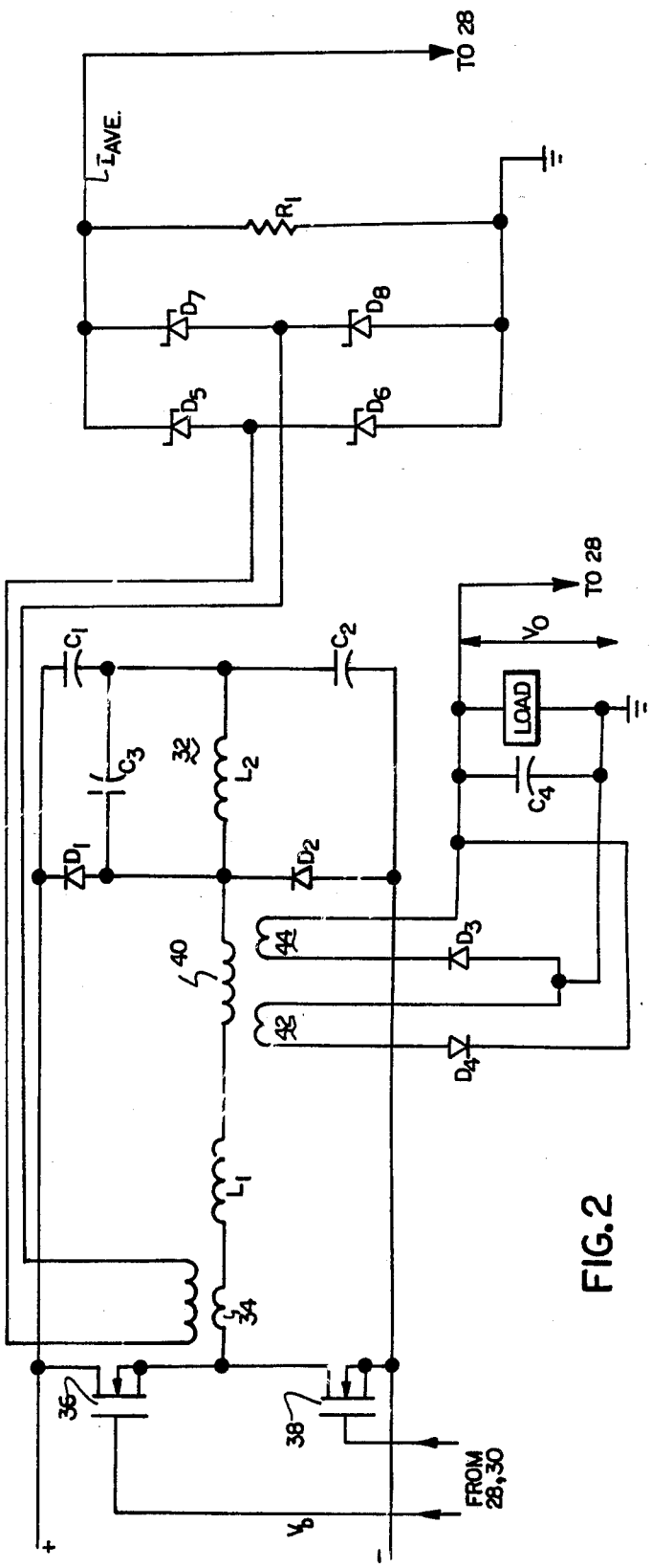
FIG. 2 is a schematic circuit diagram showing a portion of the power supply of FIG. 1 including the circuit of the present invention.

Having briefly described the operation of a power supply in conjunction with FIG. 1, attention is now directed to FIG. 2, which illustrates the series resonant converter 20, the power transformer 22 and parallel resonant circuit 32 of supply 10 in somewhat greater detail. The input to the converter is shown in FIG. 2 as being an unregulated DC voltage, $V_b$, which is representative of the output of the low-pass filter 18 in FIG. 1. The converter includes a pair of field effect transistors 36 and 38 which are alternately gated into conduction, or fully on, by the converter control 28. Whenever one of the field effect transistors is turned on, it completes a path for current to flow from the voltage source through a series resonant circuit including the primary winding 40 of power transformer 22 and a series inductor $L_1$ together with a capacitor network having an equivalent series capacitance which is the capacitance of capacitor $C_3$ of circuit 32 in series with the capacitance of the parallel combination of capacitors $C_1$ and $C_2$. Diodes $D_1$ and $D_2$ constrain, i.e. clamp, the voltage excursions across the network having the equivalent capacitance described above to thereby stabilize the resonant tank circuit. Diodes $D_1$ and $D_2$ may be referred to as clamp diodes and capacitors $C_1$ and $C_2$ can be referred to as the dominant series resonant capacitors because of the capacitance of those capacitors in comparison to the capacitance of capacitor $C_3$. The inductor $L_1$ may be present in fact or it may represent the leakage reactance of the transformer.

In operation, as control 28 turns on one of the FETS 36 and 38, a current pulse flows through the resonant circuit. Each pulse has a rise time and fall time dependent on the components in the resonant tank circuit and appears in the form of a sinusoidal pulse. At steady state conditions, these pulses will be uniformly sinusoidal in shape and have a fixed width and a fixed peak value. The current pulses $I_R$ flowing through the series resonant circuit are represented, for example, in FIGS. 3A and 3B. At medium power, or half loading conditions, the current pulses occur at a low frequency of operation of the FETS 36 and 38. As demand increases for high power, i.e., full load operation, these pulses occur at a greater frequency as is shown in FIG. 3B. To achieve operation without the FETS 36 and 38 being on at the same time, then the frequency of supplying the current pulses must be held to be somewhat less than that of a maximum resonant frequency $F_M$ which is determined by the components of the series resonant tank circuit. Consequently, a dead time between sinusoidal pulses may be relatively long at medium power requirements, but quite short during high power requirements.

As shown in FIG. 1, controller 28 senses the average current $I_{AVE}$, as well as the output voltage $V_O$ for use in controlling the frequency of operation of the power switches. The output voltage $V_O$ is taken across the load which is on the secondary side of the power transformer 22. This power transformer 22 has secondary rectification taken from a pair of secondary windings 42, 44 and interconnected with diodes $D_3$, $D_4$ to maintain a constant charge across a capacitor $C_4$ for supplying the load 46. The output voltage is taken across the load 46 and is supplied to the control 28. As the load requirements increase because of a loading effect, the frequency of the current pulses in the resonant circuit will be increased.

Control 28 also monitors the average current flowing in the resonant circuit. If the average current is considered too high for proper usage of the FETS, then the frequency of supplying current pulses through the resonant circuit will be decreased to prevent destruction of the FETS. The average current may be sensed as with a current transformer having a single turn primary winding 34 in series with the resonant circuit and its secondary winding, on the order of 60 turns, connected to a suitable circuit such as a full wave bridge rectifier made up of Schottky diodes $D_5$, $D_6$, $D_7$ and $D_8$. The full wave rectified current may take the form as shown by the pulsating waveform in FIG. 3C. A voltage representative of the average current $I_{ave}$ may be developed across a resistor $R_1$ which is connected to the bridge. This voltage is supplied to the control 28.

Figure 4:
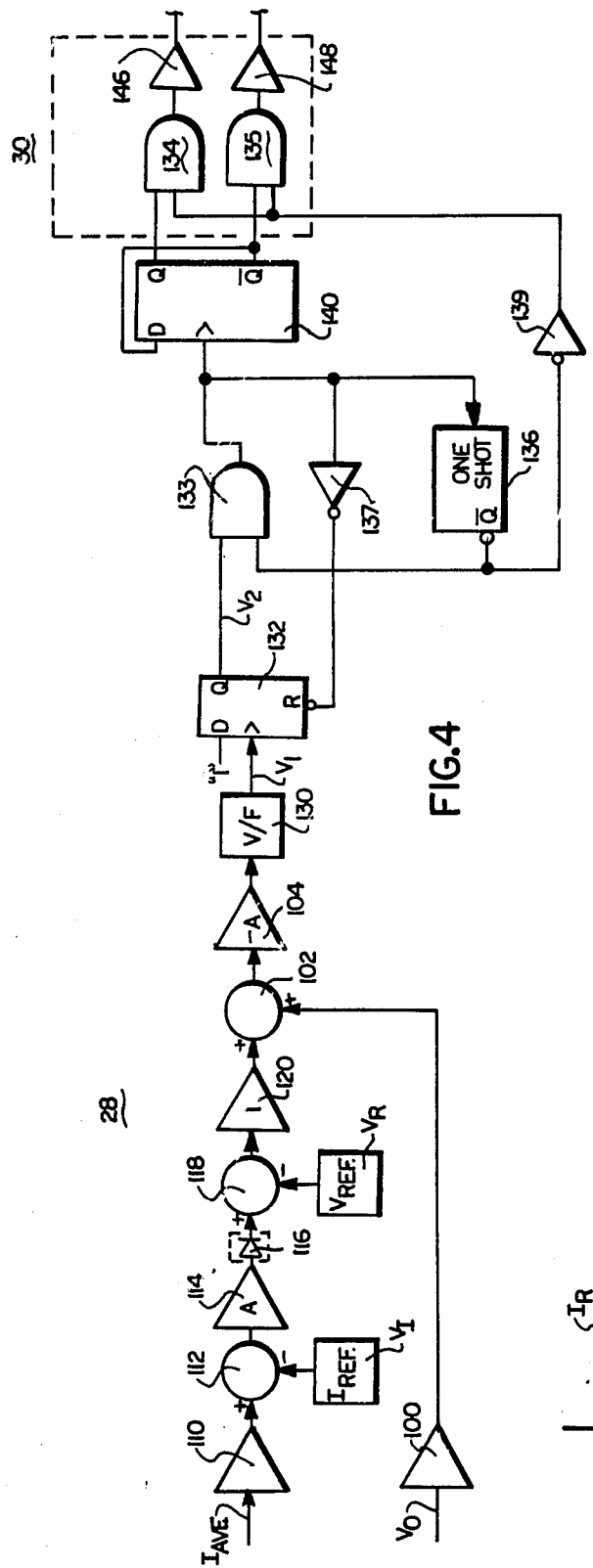
FIG. 4 shows a schematic circuit diagram for a typical embodiment for control 28 and driver 30 of the power supply of FIG. 1.

Reference is now made to FIG. 4 which illustrates the control 28 and the driver circuit 30 in greater detail. The sensed output voltage $V_O$ is received by may suitably take the form of an operational amplifier, with the amplified output then being supplied as a positive input to a summing node 102. Here, the output voltage $V_O$ is effectively compared with a reference voltage $V_R$ to develop an error signal $V_E$, after being amplified by an amplifier 104 having a gain of -A. The error signal $V_E$ is used to control the frequency at which current pulses are supplied to the series resonant circuit. This error signal is a DC voltage which may vary in magnitude from a negative value to a positive value. At its maximum positive value, it indicates that the output voltage $V_O$ is too high and should be reduced. In such case, the frequency of supplying current pulses is reduced. As the error signal $V_E$ becomes less positive or more negative, it indicates loading has taken place and that more power should be transferred and, hence, the frequency of supplying current pulses to the resonant circuit should be increased.

The error signal $V_E$ may be modified if the sensing circuit determines that the average current $I_{AVE}$ flowing through the resonant circuit is too high. In such a case, the frequency of supplying current pulses to the resonant circuit should be reduced to lower the value of the average current. For this reason, the average current is compared against a reference, and if it current is compared against a reference, and if it exceeds the reference, then the frequency of supplying pulses to the resonant circuit will be decreased by increasing the magnitude of the error signal $V_E$ in a positive direction. Otherwise, no change is made to the magnitude of the error signal.

The sensed signal representative of the average current $I_{AVE}$ is actually a voltage signal representative of this current. This voltage signal is amplified by a DC amplifier 110, which may take the form of a suitable operational amplifier, and is then supplied as a positive input to a summing circuit 112. Here, the voltage representative of the average current is compared with a voltage $V_I$ representative of a current reference and the difference in voltage levels is amplified by a suitable amplifier 114. If the amplified difference voltage is positive, then, this is indicative that the average current exceeds the reference current. This positive voltage will be passed by a diode 116 as a positive input to a summing circuit 118 which receives the voltage reference $V_R$ as a negative input. The summed signal is amplified by an amplifier 120, having a gain of 1, and is supplied as a positive input to the summing node 102. If the average current is greater than the reference current, then the effect of this is to increase in a positive direction the error signal $V_E$ so as to lower the frequency of supplying current pulses to the resonant circuit. If the average current is less than the reference current, then no voltage will be passed by diode 116 and no change will be made to the error signal $V_E$.

The error signal $V_E$ is converted by a voltage-to-frequency converter 130 so as to produce a squarewave pulse train having a frequency which varies inversely with that of the error voltage. As discussed previously, the transfer characteristics are such that when the error signal $V_E$ is positive at its maximum value, the frequency of the pulses from converter 130 decrease to produce low power operation. However, as the error signal becomes less positive or more negative, then the frequency of the pulses from converter 130 increase to provide for higher power operation. This may be envisioned with reference to the waveform in FIG. 5A which shows, during low power operation, the frequency of the squarewave output voltage $V_1$ from converter 130 is low and then increases in frequency for one-half power and full power operations.

The voltage-to-frequency converter 130 may take the form of a typical voltage controlled oscillator and when the output voltage $V_1$ goes positive, it is supplied to the clock input of a D-type flip-flop 132 having its D input tied to a positive or binary 1 voltage level. Consequently, when converter voltage $V_1$ goes high, this causes the Q output voltage $V_2$ to go high.

Each time the output voltage $V_2$ of flip-flop 132 goes high, it clocks through AND gate 133 a D-type flip-flop 140 and the one shot 136. The flip-flop 140 has its Q output inverted and fed back to the D input thereof so that the flip-flop acts as a divide-by-two counter. The one shot 136 resets the flip-flop 132 through inverter 137 and by inverter 139 enables the AND gates 134 and 135. Consequently, as positive going pulses are supplied to the clock input, the Q and Q outputs alternately provide high or binary one (1) signals to the gates 134 and 135. As described above the gates 134 and 135 are enabled by the one shot 136 whose period is about equal to the time duration of one of the series resonant current pulses. Therefore, the gates 134 and 135 drive the buffers 146 and 148 to alternately turn on the power switches 36 and 38 in the resonant converter.

Figure 3:
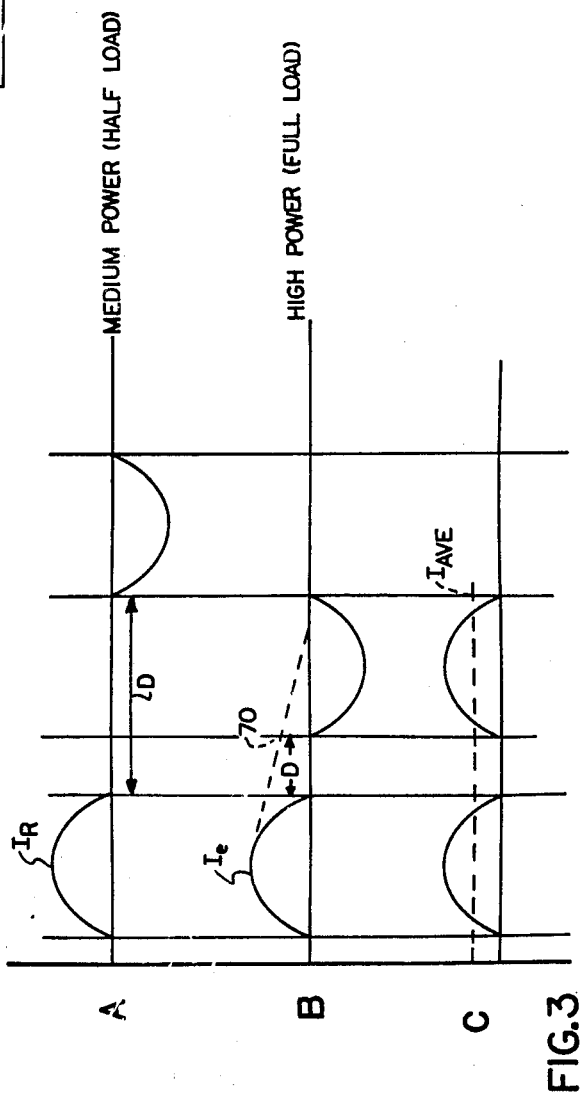
FIG. 3 shows various current waveforms related to the operation of the power supply of FIG. 1.

Having described the control 28 for the series resonant converter with reference to FIGS. 3 and 4, attention is now redirected to FIGS. 1 and 2. Situations may develop, such as for short periods of time, during which the loading subsides to a low level and the operating frequency drops considerably below the maximum resonant frequency (on the order of 200 KHz) into that of the audible range, namely below 20 KHz. It is contemplated that one application of the power supply 10 is for providing power to telephone lines. If the series resonant converter 20 operates in this audible range, objectionable audible noise will be injected onto the telephone lines. This is because a ripple voltage takes place across capacitor $C_4$ and feeds the output. This ripple voltage is particularly troublesome when its frequency falls within the telephone voice band, namely 300 Hz to 3400 Hz. At low power requirements, such as under 150 watts, the operating frequency of the series resonant converter may be below 20 KHz. The ripple voltage may inject audible noise onto the telephone lines. It is, therefore, desirable to limit the operating frequency range of series resonant converter 20 so that it does not fall below 20 KHz. Such limiting is provided by parallel resonant circuit 32. The manner in which circuit 32 operates to provide that limiting will now be described.

The power output, P, of the converter is given by the equation:

$$P = q \cdot V_b \cdot f$$

where q is the charge transferred in one operating cycle, $V_b$ is the unregulated DC voltage appearing across the FETS as shown in FIG. 2, and f is the converter operating frequency. When the converter is operating at frequencies well above the resonant frequency of circuit 32, i.e., at relatively high load conditions, the charge, q, transferred in each operating cycle is constant. As can be seen from FIG. 3, each half cycle of the resonant current has the same amplitude and duration even as the load varies from full load to half load. The only effect of a changing load is to cause the time between the occurrence of the half cycles to increase as the load lightens. Therefore, for such operating conditions the power output will vary directly with converter operating frequency.

If circuit 32 were not present the variations of power output with operating frequency and constant charge transfer described above would continue until almost no load operating conditions were reached. Well before no load the operating frequency would have decreased to be within the audible range giving rise to the objectionable noise described above. Circuit 32 serves to limit the operating frequency to be no lower than the parallel resonant frequency of the circuit. If that frequency is chosen to be above the audible range, i.e. 20 KHz or higher, then the objectionable noise cannot occur.

As the converter load lightens its operating frequency approaches the resonant frequency of circuit 32. The impedance of circuit 32 increases at a substantial rate towards the ideal impedance of infinity as the converter operating frequency approaches the circuit's resonant frequency. The effect of this increasing impedance is to cause the amplitude of the series resonant current to decrease. The duration remains unaffected. That current is the input current to circuit 32. The amplitude of the series resonant current is directly related to the amount of charge, q, transferred in each operating cycle. As the operating frequency further decreases in load, i.e. further decreases in the required power output from the converter, are obtained not from decreases in operating frequency but rather from decreases in the amount of charge transferred. In other words as the operating frequency is limited to be no lower than the parallel resonant frequency of circuit 32 it can be considered to be essentially constant as the load lightens to the point where the operating frequency is close to the resonant frequency. As shown by the equation for output power previously described above the only parameter which can then change to provide the changes in power output is the charge that is being transferred. Therefore, the inclusion of circuit 32 in the converter results in the variation of transferred charge with power output as the operating frequency approaches the resonant frequency of circuit 32.

In summary, the operating frequency of the converter is limited to remain above the audible range by the inclusion therein of a circuit 32 whose resonant frequency is selected to be above the range. As the frequency can no longer decrease with decreasing load, i.e. power output requirements, the charge transferred, which is constant at higher operating frequencies, must decrease with decreasing load. In other words, circuit 32, while providing a lower limit to the converter operating frequency, does not impair the ability of the converter to respond to changes in power output requirements. Only the mechanism by which the converter meets those changing requirements is altered.

I have found that the location of parallel resonant circuit 32 in the converter is critical. As shown in FIG. 2, inductor $L_2$ and capacitor $C_3$ of circuit 32 are connected in parallel between the junction of clamping diodes $D_1$ and $D_2$ and the junction of capacitors $C_1$ and $C_2$.

Circuit 32 could have been located in series with inductor $L_1$ and the primary winding 40 of the power transformer. While circuit 32 would function when so located to keep the operating frequency of the converter from dropping into the audible range, I have found that so placing circuit 32 may result in destruction of FETS 36 and 38. The manner in which that destruction may occur will now be described.

When the converter is operating in a light load condition its series resonant frequency, i.e. the operating frequency of the converter, is slightly higher than the resonant frequency of parallel circuit 32. For this load condition the voltage across circuit 32 will reach its maximum sometime after the series resonant current ceases to flow. Therefore, the current into circuit 32 leads the voltage across the circuit by 90°.

At zero resonant current the voltage at the junction of the series resonant capacitors $C_1$ and $C_2$ for this load condition is equal to about one-half of the unregulated DC voltage $V_b$. The peak value of the voltage across circuit 32 can exceed one-half of $V_b$ for light loads. This difference in voltage can cause the parasitic diode of the FET which had just been conducting to conduct. This parasitic diode is the collector base junction of an electrically fragile bipolar transistor which is structurally part of the FET manufacturing process. When the off FET is turned on the bipolar transistor recovers. This recovery may cause the bipolar transistor to avalanche, thereby destroying both of FETS 36 and 38. The mechanism by which the bipolar transistor can avalanche is known to those skilled in the art. For a detailed discussion of this mechanism reference can be made to the technical article identified as TA84-4 published by Siliconix of Santa Clara, Calif. and entitled "$dV_{DS}/dt$ Turn-on In MOSFETs". A summary of this mechanism is given below.

When the parasitic diode is in conduction and the alternate FET, i.e. the then off FET, turns on the diode will attempt to recover. A recovery current will flow through the base-emitter resistor of the bipolar transistor in a direction away from the transistor's base. This current flow causes the base to become higher in voltage than the emitter. The transistor may then enter a mode of operation in which it can avalanche.

I have found that when circuit 32 is connected as shown in FIG. 2 the diodes $D_1$ and $D_2$ will cause the voltage across circuit 32 to be clamped to one-half of the unregulated DC voltage. This clamping action prevents the turning on of the parasitic diode described above. Therefore, locating circuit 32 as shown in FIG. 2 does not allow a condition to occur which would give rise to destruction of FETS 36 and 38.

It should be appreciated that diodes $D_1$ and $D_2$ are not circuit elements which have been added to converter 20. These diodes would be part of the converter whether or not supply 10 included parallel resonant circuit 32. If circuit 32 were to be located in series with inductor $L_1$ and primary winding 40 as described above, the destruction of FETS 34 and 36 could only be prevented by the inclusion in converter 20 of a number of elements in addition to those (such as diodes $D_1$ and $D_2$) already present. This is not desirable as the purpose of using circuit 32 is to provide a simple and inexpensive means of placing a lower limit on converter operating frequency. Therefore, locating circuit 32 as shown in FIG. 2 allows for the desirable limitation of the converter operating frequency to be above the audible range without any detrimental effect on the operation of FETS 34 and 36 and also without the need to introduce other elements to compensate for the presence of circuit 32 in the converter.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. A controllable converter device for providing electrical current to a load comprising in combination:
   (a) a power source;
   (b) first and second connected switch means;
   (c) first and second connected clamp diode means;
   (d) a primary winding of a transformer, said winding being interposed between said connected switch means and said connected clamp diode means;
   (e) first and second connected capacitor means, said first and second connected switch means, said first and second connected diode clamp means and said first and second connected capacitor means each being connected across said power source;
   (f) control means for actuating said first and second connected switch means on and off at an operating frequency dependent upon said load such that when said switch means are alternately turned on sinusoidal current pulses alternately flow from said source in opposing directions in said primary winding; and
   (g) parallel resonant circuit means having a predetermined resonant frequency, said circuit means interposed between said first and second connected diode clamp means and said first and second connected capacitor means to thereby limit said operating frequency to be no lower than said parallel resonant frequency.

2. The converter of claim 1 wherein said parallel resonant circuit comprises capacitor means in parallel with inductor means.

3. The converter of claim 2 wherein said parallel resonant circuit predetermined frequency is at least above the upper frequency of the telephone voice band.

4. The converter of claim 1 wherein said first and second connected switch means are FETs.

5. The converter of claim 4 wherein said parallel resonant circuit comprises capacitor means in parallel with inductor means.

6. A controllable converter device for providing electrical current to a load comprising in combination:
   (a) a power source;
   (b) first and second switch means, each of said switch means having first, second and third electrodes, said first switch means second electrode being connected to said second switch means first electrode;
   (c) first and second clamp diodes, each of said diodes having first and second electrodes, said first diode second electrode being connected to said second diode first electrode;
   (d) a primary winding of a transformer, said winding having first and second terminals, said first terminal being connected to said connection of said first and second switch means to each other, said second terminal being connected to said connection of said first and second clamp diodes to each other;
   (e) first and second capacitors, each of said capacitors having first and second terminals, said first capacitor second terminal being connected to said second capacitor first terminal, said first switch means first electrode and said second switch means second electrode; and said first clamp diode first electrode and said second clamp diode second electrode; and said first capacitor first terminal and said second capacitor second terminal all being connected across said power source;
   (f) control means for actuating said first and second connected switch means on and off by providing signals at said first and second switch means third electrodes at an operating frequency dependent upon said load such that when said switch means are alternately turned on sinusoidal current pulses alternately flow from said source in opposing directions in said primary winding; and
   (g) parallel resonant circuit means having a predetermined resonant frequency, said circuit means having first and second terminals, said first terminal being connected to said first and second clamp diode connection to each other, said second terminal being connected to said connection of said first and second capacitors to each other, said circuit limiting said operating frequency to be no lower than said parallel resonant frequency.

7. The converter of claim 6 wherein said parallel resonant circuit comprises capacitor means in parallel with inductor means.

8. The converter of claim 7 wherein said parallel resonant circuit predetermined frequency is at least above the upper frequency of the telephone voice band.

9. The converter of claim 6 wherein said first and second connected switch means are FETs.

10. The converter of claim 9 wherein said parallel resonant circuit comprises capacitor means in parallel with inductor means.

* * * * *